United States Patent
Monacchio et al.

(10) Patent No.: US 9,567,087 B1
(45) Date of Patent: Feb. 14, 2017

(54) HONEYCOMB ACOUSTIC LINER

(71) Applicant: HAMILTON SUNDSTRAND CORPORATION, Windsor Locks, CT (US)

(72) Inventors: John D. Monacchio, Windsor Locks, CT (US); Blair A. Smith, South Windsor, CT (US); Michael E. Folsom, Ellington, CT (US); Christopher Simpson, West Hartford, CT (US); Murtuza Lokhandwalla, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/971,480

(22) Filed: Dec. 16, 2015

(51) Int. Cl.
*B64D 13/00* (2006.01)
*F24F 13/24* (2006.01)

(52) U.S. Cl.
CPC ............... *B64D 13/00* (2013.01); *F24F 13/24* (2013.01); *F24F 2013/242* (2013.01)

(58) Field of Classification Search
CPC . B64D 13/00; F24F 2013/242; F24F 13/0263; F16L 9/21
USPC .............................. 454/76; 181/224, 225, 292
See application file for complete search history.

(56) References Cited

U.S. PATENT DOCUMENTS

| | | | |
|---|---|---|---|
| 8,789,650 B2 * | 7/2014 | West ...................... | B64D 13/00 181/224 |
| 8,899,377 B2 * | 12/2014 | Thomas ................. | B64D 13/00 181/224 |
| 2009/0200103 A1 * | 8/2009 | Potschka .................. | F15D 1/04 181/224 |
| 2009/0260706 A1 * | 10/2009 | Hesse ..................... | B64D 13/00 138/144 |
| 2011/0056580 A1 * | 3/2011 | Hoefle ...................... | F16L 9/14 138/111 |

* cited by examiner

*Primary Examiner* — Jeremy Luks
(74) *Attorney, Agent, or Firm* — Cantor Colburn LLP

(57) ABSTRACT

An acoustic liner for a duct of an air conditioning and temperature control system including a honeycomb structure having a thickness of about 0.375±0.006 inches (0.953±0.015 centimeters). The acoustic liner is configured to cover an outer surface of a cylinder having a length of about 30 inches (76 centimeters) and an outer diameter of about 8.30 inches (21.1 centimeters).

12 Claims, 12 Drawing Sheets

HONEYCOMB ACOUSTIC LINER

BACKGROUND OF THE INVENTION

Embodiments of this invention generally relate to an aircraft air conditioning system, and more particularly, to an acoustic liner within a cabin supply duct of an aircraft air conditioning and temperature control system.

Aircraft include cabin air conditioning and temperature control systems (CACTCS) that provide conditioned air to passenger compartments, cockpits and the like. In many cases, engine compressor bleed air is supplied to the CACTCS. The temperature, pressure, and humidity of the bleed air generally depends upon which compressor extraction location is coupled to the CACTCS. In other cases, air for the CACTCS is provided by electrically driven compressors. In either case, the air is passed to portions of the aircraft through a cabin supply duct fluidly coupled to the compressor. The process of conditioning the air creates vibrations in the air molecules, which generates unwanted noise as the air passes through the cabin supply duct.

BRIEF DESCRIPTION OF THE INVENTION

An acoustic liner for a duct of an air conditioning and temperature control system including a honeycomb structure having a thickness of about 0.375±0.006 inches (0.953±0.015 centimeters). The acoustic liner is configured to cover an outer surface of a cylinder having a length of about 30 inches (76 centimeters) and an outer diameter of about 8.30 inches (21.1 centimeters).

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
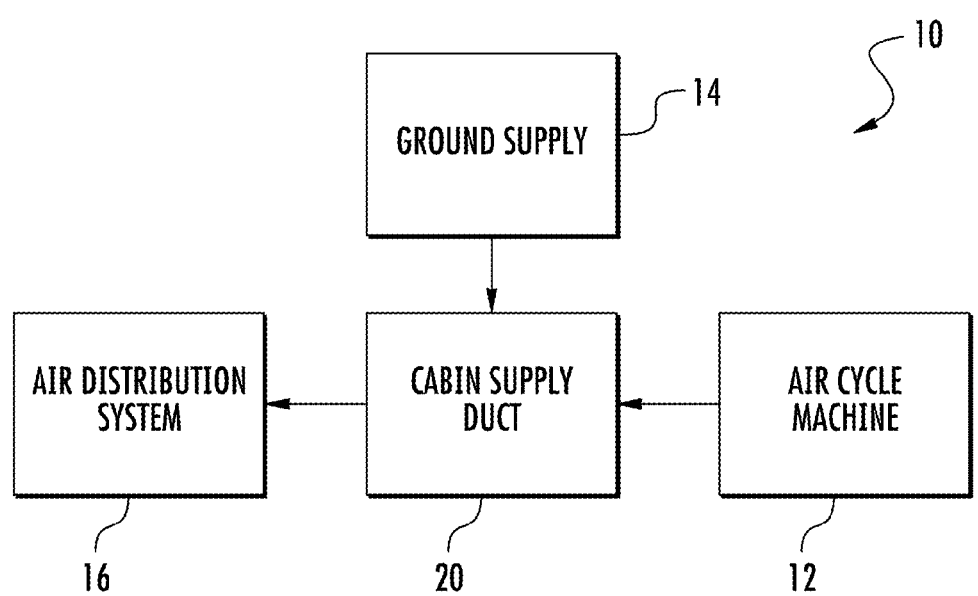
FIG. 1 is a schematic diagram of a cabin supply duct subsystem of an aircraft.

Referring now to FIG. 1, an example of a cabin supply duct subsystem 10 of a larger cabin air conditioning and temperature control system (CACTCS) pack is schematically illustrated. The subsystem 10 includes an air cycle machine 12 that provides conditioned air to an air distribution system 16 through a cabin supply duct 20. The air cycle machine 12 may condition air for both temperature and humidity. The air distribution system 16 distributes the conditioned air throughout the cabin of an aircraft, which includes the cockpit. Subsystem 10 also includes a ground supply 14 that provides conditioned air from a ground terminal typically at an airport gate to the air distribution system 16 through the cabin supply duct 20. The ground supply 14 alleviates the need to run the air cycle machine 12 while the aircraft is parked at a gate. The cabin supply duct 20 helps direct the airflow and reduce vibrational noise that is typically a byproduct of conditioned air from the air cycle machine 12 and ground supply 14. The vibrational noise reduction is accomplished using an acoustic liner 38 as seen in FIG. 3.

Figure 2:
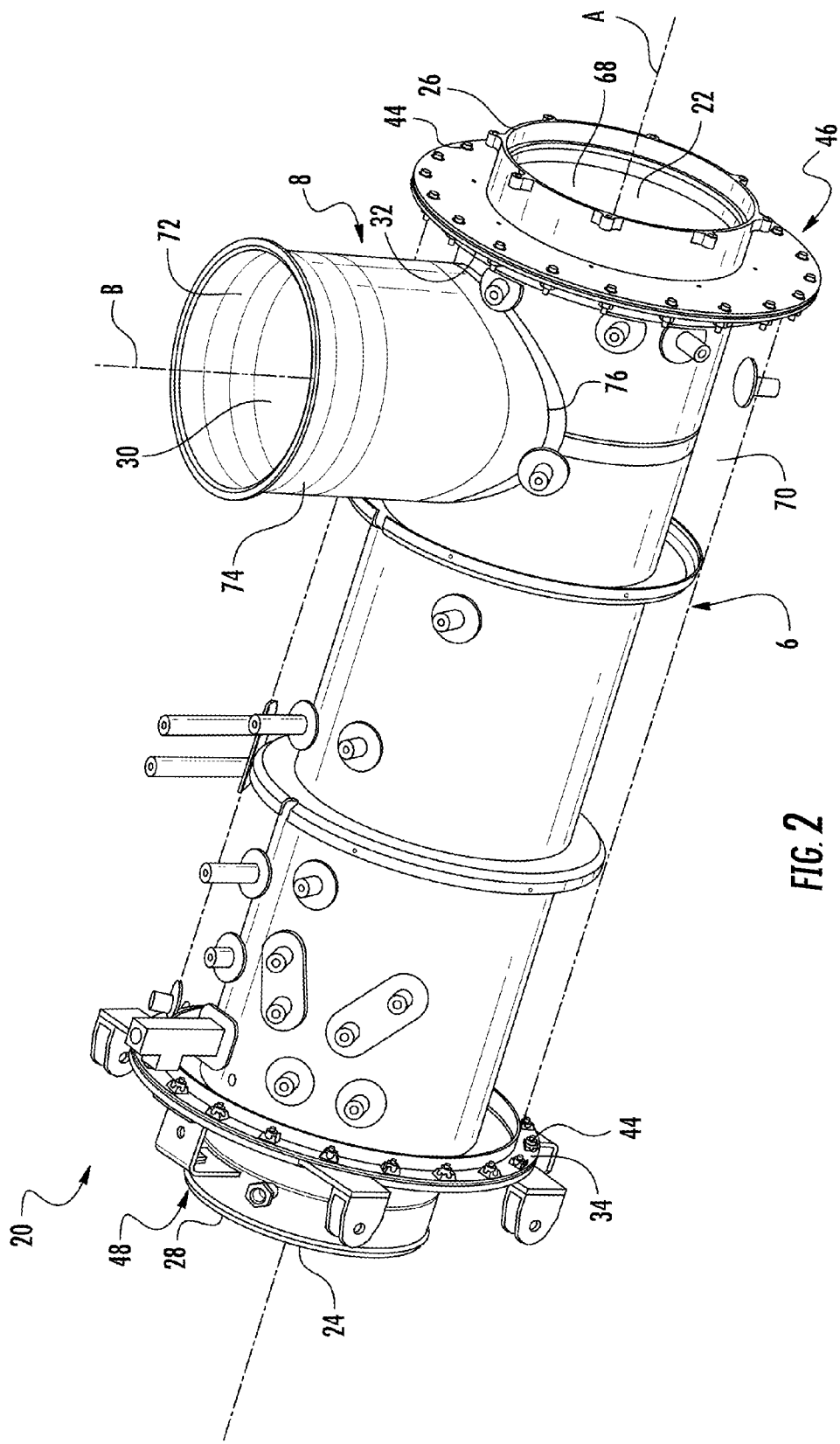
FIG. 2 is an isometric view of a cabin supply duct, according to an embodiment of the invention.
Figure 3:
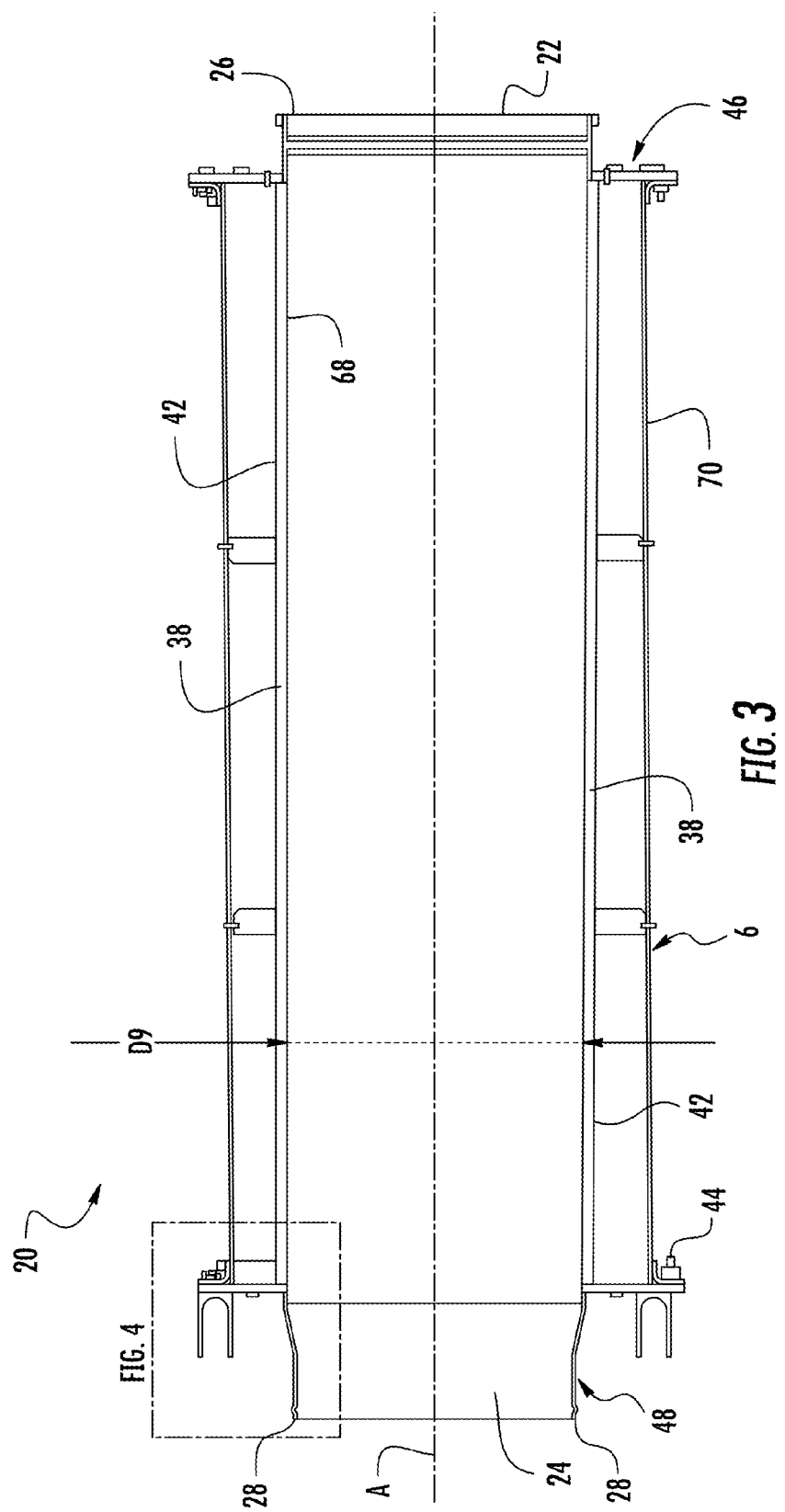
FIG. 3 is a cross-sectional side view of the cabin supply duct, according to an embodiment of the invention.
Figure 9:
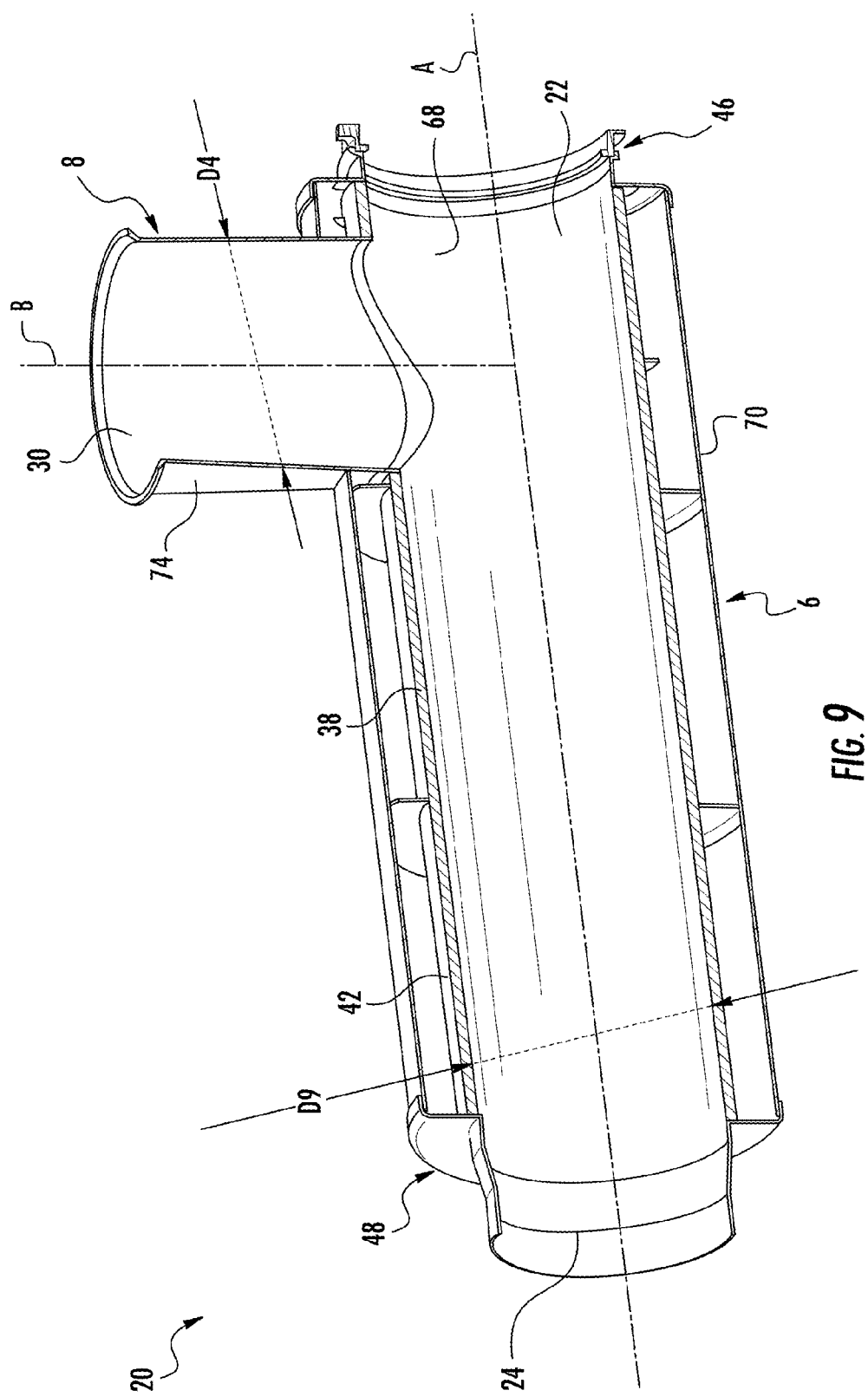
FIG. 9 is an isometric cross-sectional view of the cabin supply duct, according to an embodiment of the invention.

An example of a cabin supply duct 20 is shown in FIGS. 2, 3 and 9, where the cabin supply duct 20 is tubular in shape. In the illustrated embodiment, the cabin supply duct 20 consists of two intersecting tubular bodies, a first tubular body 6 and a second tubular body 8. The first tubular body 6 is composed of an inlet 22, an outlet 24, an inner surface 68, an outer surface 70, a longitudinal axis A, an inner shell surface 42 located between the inner surface 68 and outer surface 70 at distance of about 0.375±0.006 inches (0.953±0.015 centimeters) away from the inner surface 68, and an acoustic liner 38 located between the inner surface 68 and the inner shell surface 42 of the first tubular body 6. The inlet 22 is configured to receive conditioned air from the air cycle machine 12 and the outlet 24 is configured to distribute the conditioned air to the cockpit or cabin of an aircraft through the air distribution system 16.

The second tubular body 8 is composed of an inlet 30, an outlet 76, an inner surface 72, an outer surface 74, and a longitudinal axis B. The inner surface 72 of the second tubular body 8 is fluidly connected to the inner surface 68 of the first tubular body 6 at the outlet 76. Longitudinal axis A is positioned perpendicular to longitudinal axis B, as can be seen in FIGS. 2 and 9. The inlet 30 is configured to receive conditioned air from a ground supply 14 and distribute the conditioned air through the first tubular body 6 out the outlet 24 to the air distribution system 16. In another embodiment, second tubular body 8 has an outer surface 74 diameter D4 of about 8 inches (20 centimeters), as seen in FIG. 9.

The cabin supply duct 20 includes an inlet endcap 46 and an outlet endcap 48. The inlet endcap 46 is connected to the inlet 22 of the first tubular body 6 at a first flange 32 using fasteners 44. The outlet endcap 48 is connected to the outlet 24 of the first tubular body 6 at a second flange 34 using fasteners 44. The inlet endcap 46 includes an inlet surface 26 to line up flush with the connection to the air cycle machine 12. The outlet endcap 48 includes an outlet surface 28 to line up flush with the connection to the air distribution system 16. FIG. 2 shows a longitudinal axis A that travels through the first tubular body 6 from the center point of inlet 22 to the center point of the outlet 24. FIG. 2 also shows a longitudinal axis B that travels through the second tubular body 8 from the center point of the inlet 30 to the center point of the outlet 76.

Figure 4:
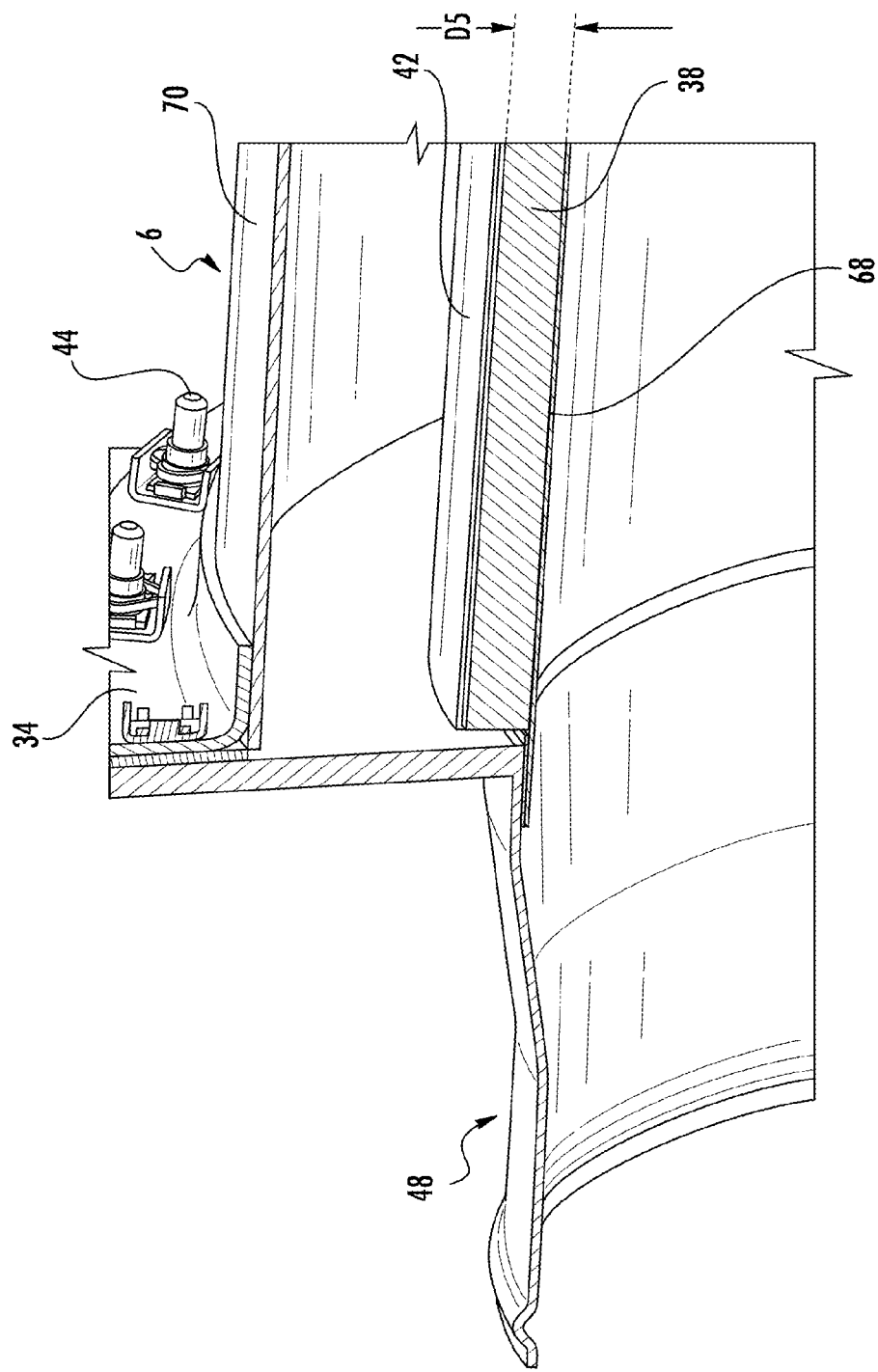
FIG. 4 is a magnified cross-sectional side view of the cabin supply duct towards an outlet end, according to an embodiment of the invention.

Referring to FIGS. 3 and 4, a cross-sectional side view of a cabin supply duct 20, specifically the first tubular body 6 is illustrated in more detail. FIG. 3 shows an acoustic liner 38 that is enclosed between an inner surface 68 and an inner shell surface 42 of the first tubular body 6. FIG. 4 shows a magnified view of the acoustic liner 38 towards the outlet endcap 48. The acoustic liner may be installed or removed by separating the outlet endcap 48 or the inlet endcap 46 from the first tubular body 6 by disconnecting the fasteners 44. In one embodiment, the inner surface 68 may be porous or perforated in order to allow sound waves to pass through the inner surface 68. In a further embodiment, the inner surface 68 may composed of a stainless steel felt liner. In another embodiment, the inner shell surface 42 is composed of aluminum.

Figure 5:
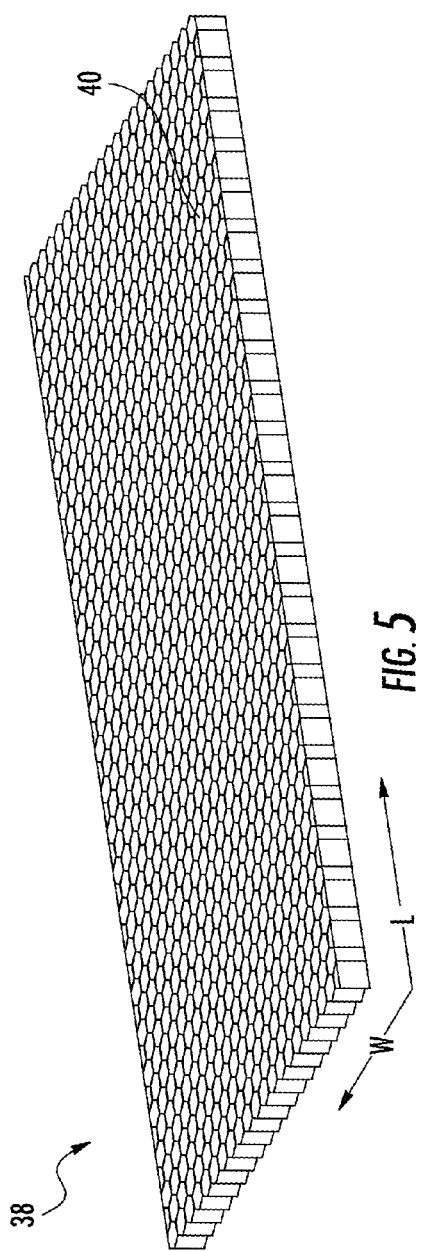
FIG. 5 is an isometric view of an acoustic liner with a honeycomb structure, according to an embodiment of the invention.
Figure 6:
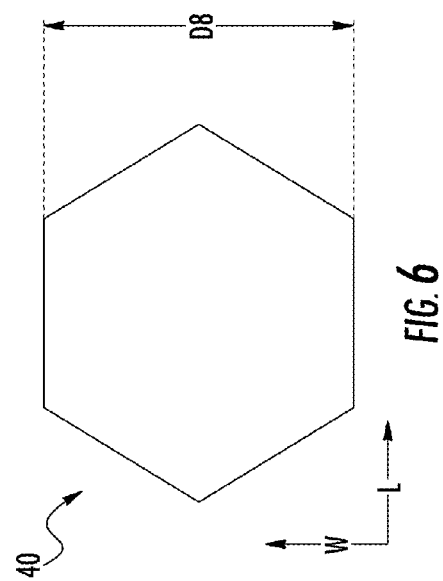
FIG. 6 is a top view of a hexagonal cell of the acoustic liner with a honeycomb structure, according to an embodiment of the invention.
Figures 7, 8:
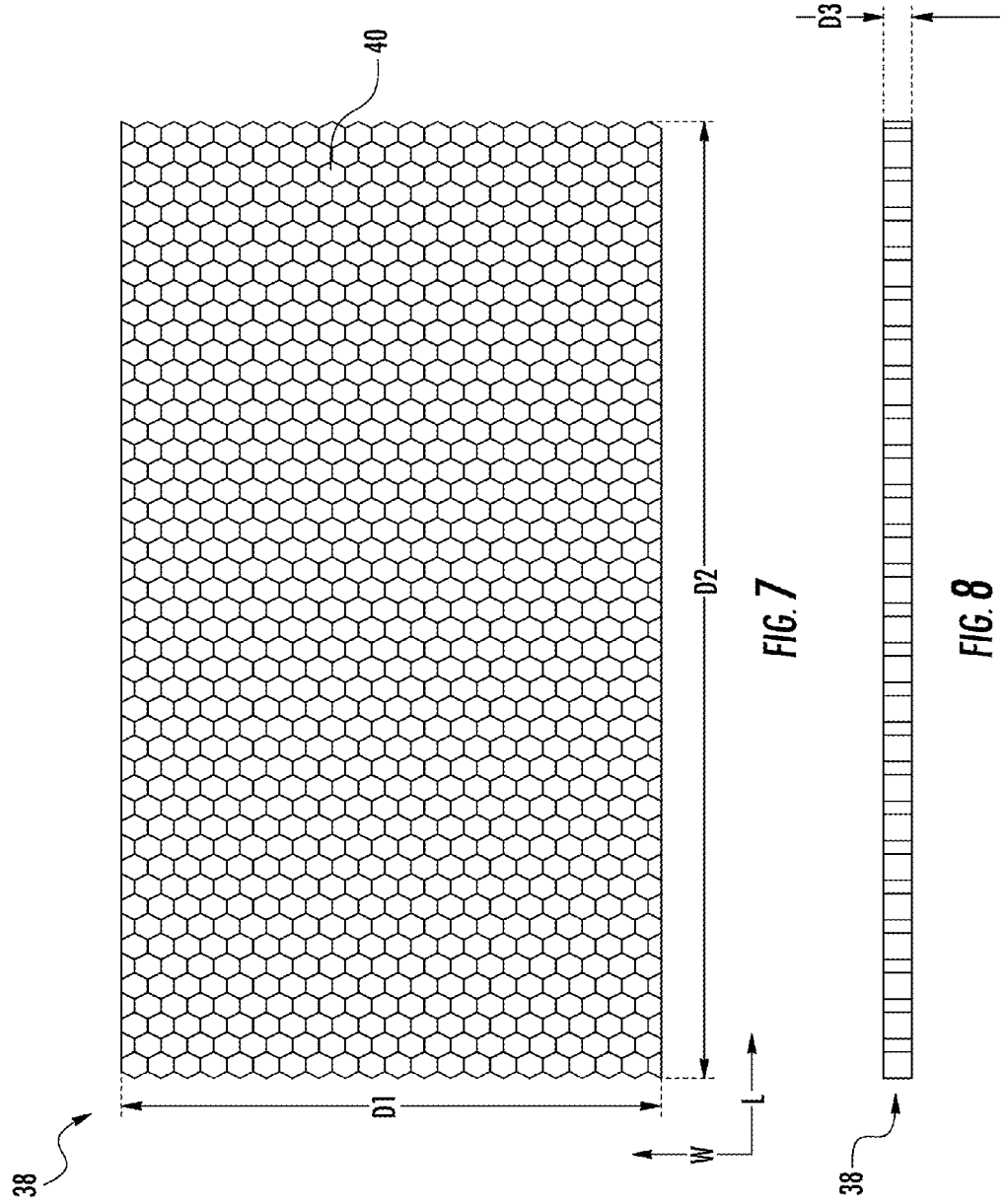
FIG. 7 is a top view of the acoustic liner with a honeycomb structure, according to an embodiment of the invention.
FIG. 8 is a side view of the acoustic liner with a honeycomb structure, according to an embodiment of the invention.

The purpose of the acoustic liner 38 is to reduce the vibrational noise that is typically a byproduct of conditioned air from the air cycle machine 12 or ground supply 14. In one embodiment, the acoustic liner is configured to cover an outer surface of a cylinder having a length D9 of about 30 inches (76 centimeters) and an outer diameter of about 8.30 inches (21.1 centimeters). In a further embodiment, the acoustic liner is rectangular and has dimensions D1×D2 of about 26 inches×30 inches (66 centimeters×72 centimeters), as seen in FIG. 7. In another embodiment, the acoustic liner 38 has a thickness D3 of about 0.375±0.006 inches (0.953±0.015 centimeters), as seen in FIG. 8. The acoustic liner 38 maintains the proper distance D5 between the inner surface 68 and the inner shell surface 42 across the length of the first tubular body 6. This distance D5, as can be seen in FIG. 4, allows sounds waves produced by vibrations in the air passing through the cabin supply duct 20 to travel through the inner surface 68 and the acoustic liner 38, and then bounce off the inner shell surface 42, which reduces the amplitude of the sound wave. In further embodiments, the acoustic liner 38 is composed of fibrous aramid honeycomb material per AMS3714, and the inner surface 68 is 0.016 inches thick and composed of a feltmetal liner per D12-S3/1817. The fibrous aramid material offers the additional benefit of inhibiting galvanic corrosion. Acoustic liners made from metallic materials, such as aluminum, tend to promote galvanic corrosion among the adjacent metallic parts with dissimilar electrode potentials. In further embodiments, the acoustic liner 38 may be composed of various other composite materials including a reinforcement material and a resin. The reinforcement material may be but is not limited to a fiberglass, carbon fiber, or nickel coated carbon fiber. The resin may be but is not limited to polyester, epoxy, phenolic, silicone, or polyimide. The honeycomb structure provides a lightweight and structurally sound solution to maintain the proper separation between inner surface 68 and the inner shell surface 42. In another embodiment, the core density of the honeycomb structure is about 3.0 lb/ft$^3$ (0.048 g/cm$^3$). In a yet another embodiment, the honeycomb structure is composed of a plurality of hexagonal cells 40, as seen in FIG. 5. In a further embodiment, the hexagonal cells 40 have a nominal size D8 of about 3/16 inches (0.47625 centimeters), as seen in FIG. 6. In a further embodiment, the hexagonal cells 40 are also over-expanded so that the acoustic liner 38 can be wrapped cylindrically around the outer diameter of the inner surface 68 without the individual hexagonal cells 40 buckling, the inner surface 68 having an outer diameter of about 8.30 inches (21.1 centimeters). The term over-expanded is used to describe how the hexagonal cells 40 have been slightly lengthened in the L direction to facilitate curving in the W direction around a cylindrical object.

Figure 10:
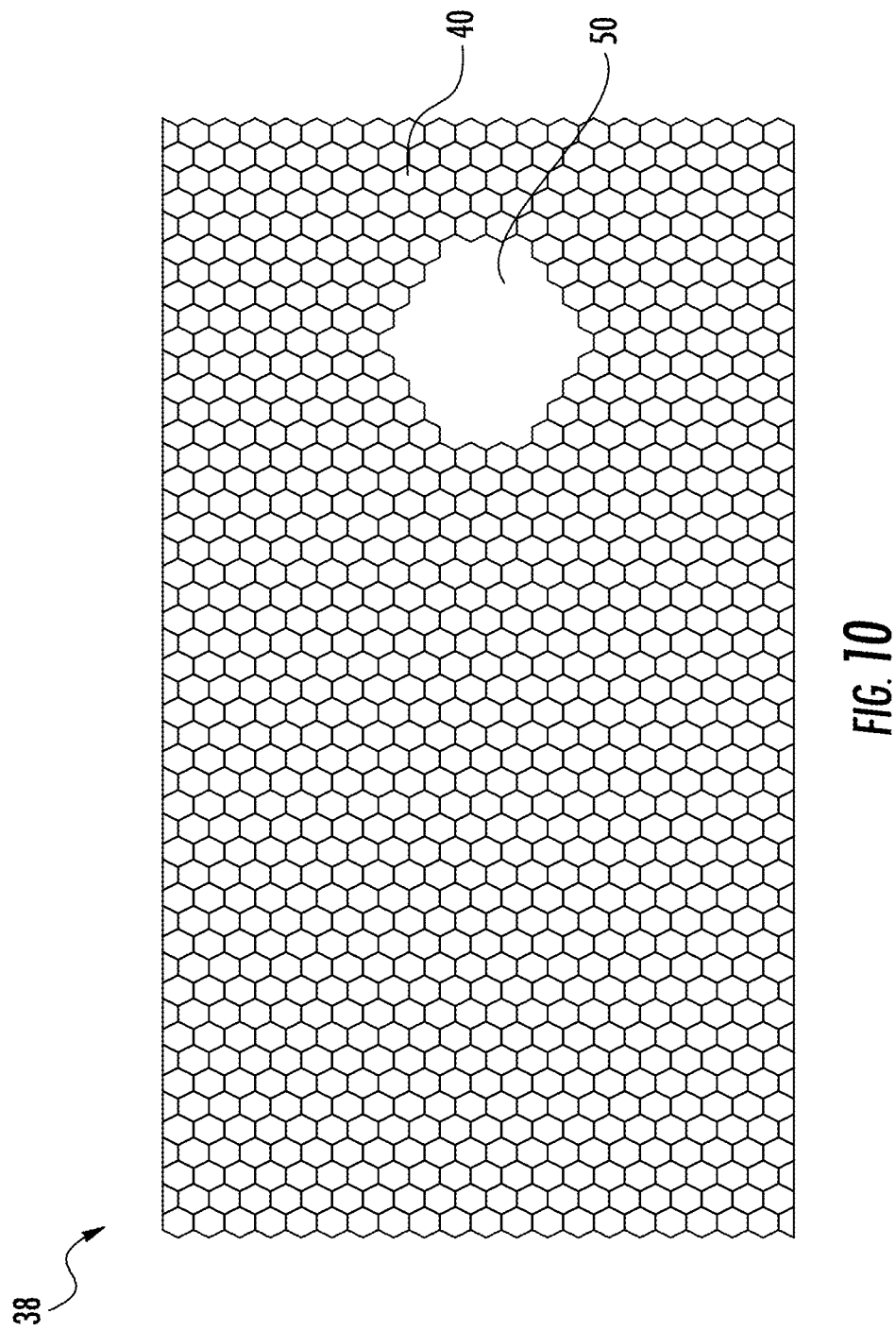
FIG. 10 is a top view of the acoustic liner with a honeycomb structure containing a centralized through hole, according to an embodiment of the invention.
Figure 11:
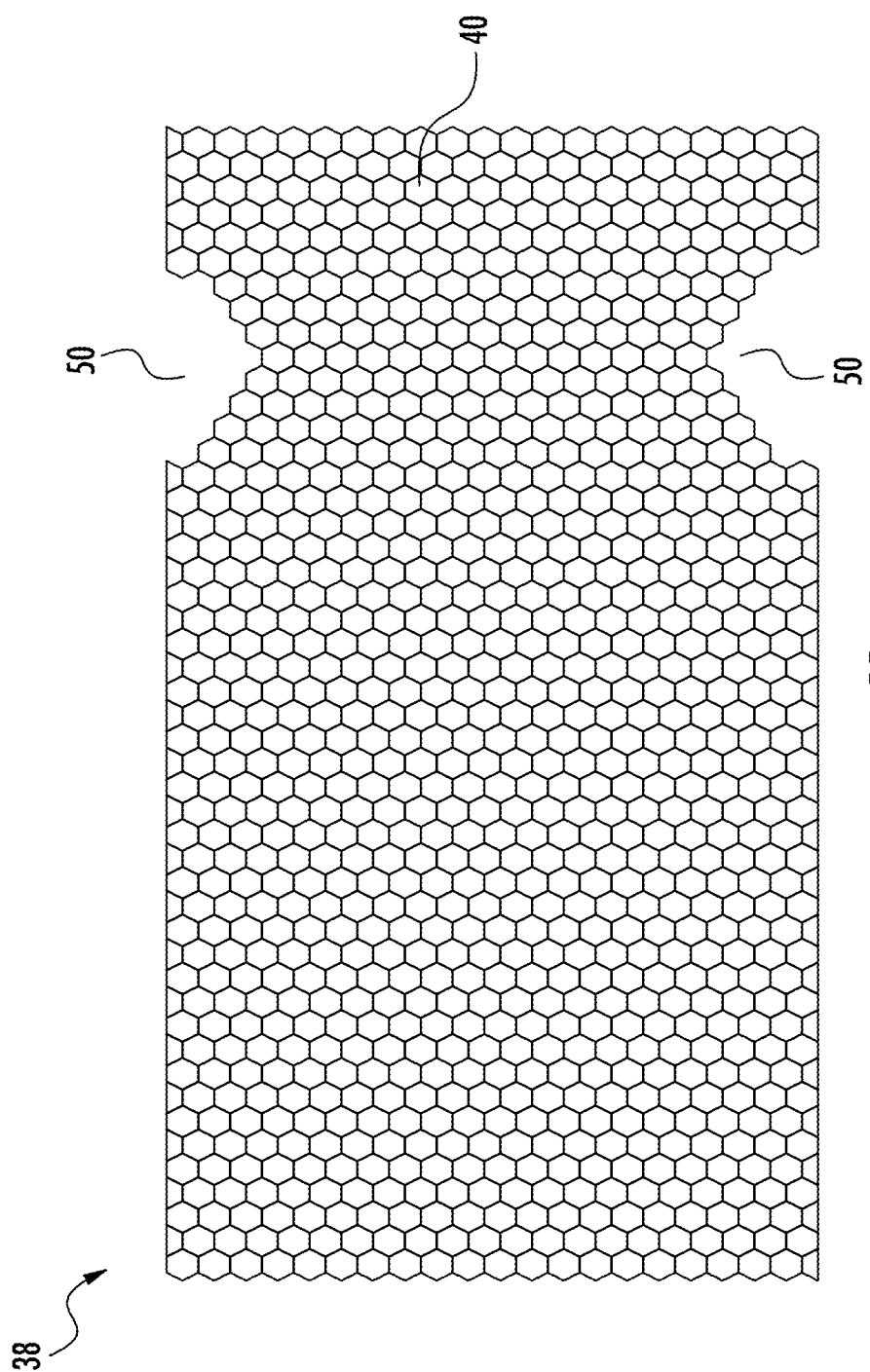
FIG. 11 is a top view of the acoustic liner with a honeycomb structure containing through holes at the edges, according to an embodiment of the invention.
Figure 12:
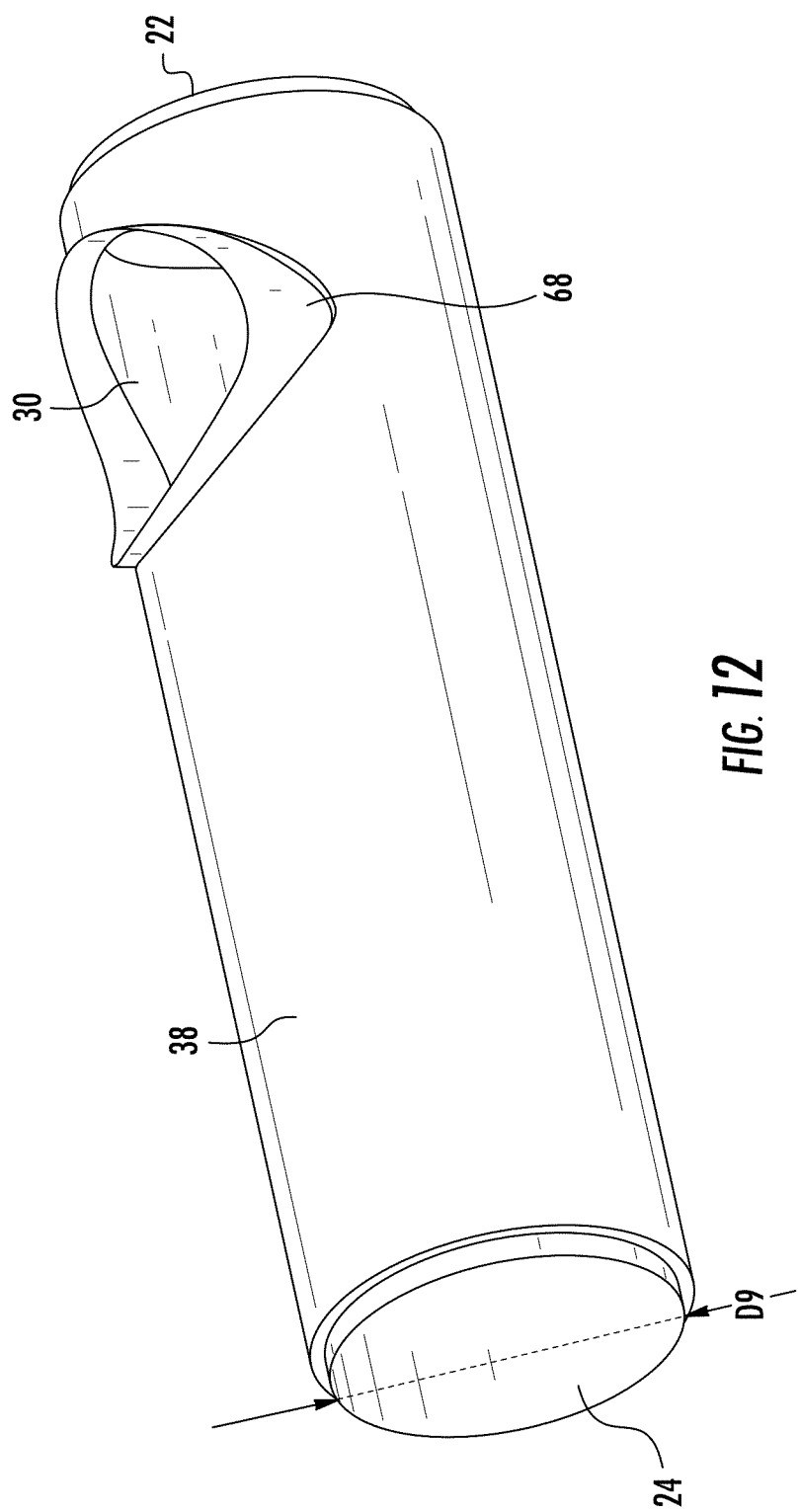
FIG. 12 is an isometric view of the acoustic liner wrapped around an inner surface of the cabin supply duct, according to an embodiment of the invention.
Figure 13:
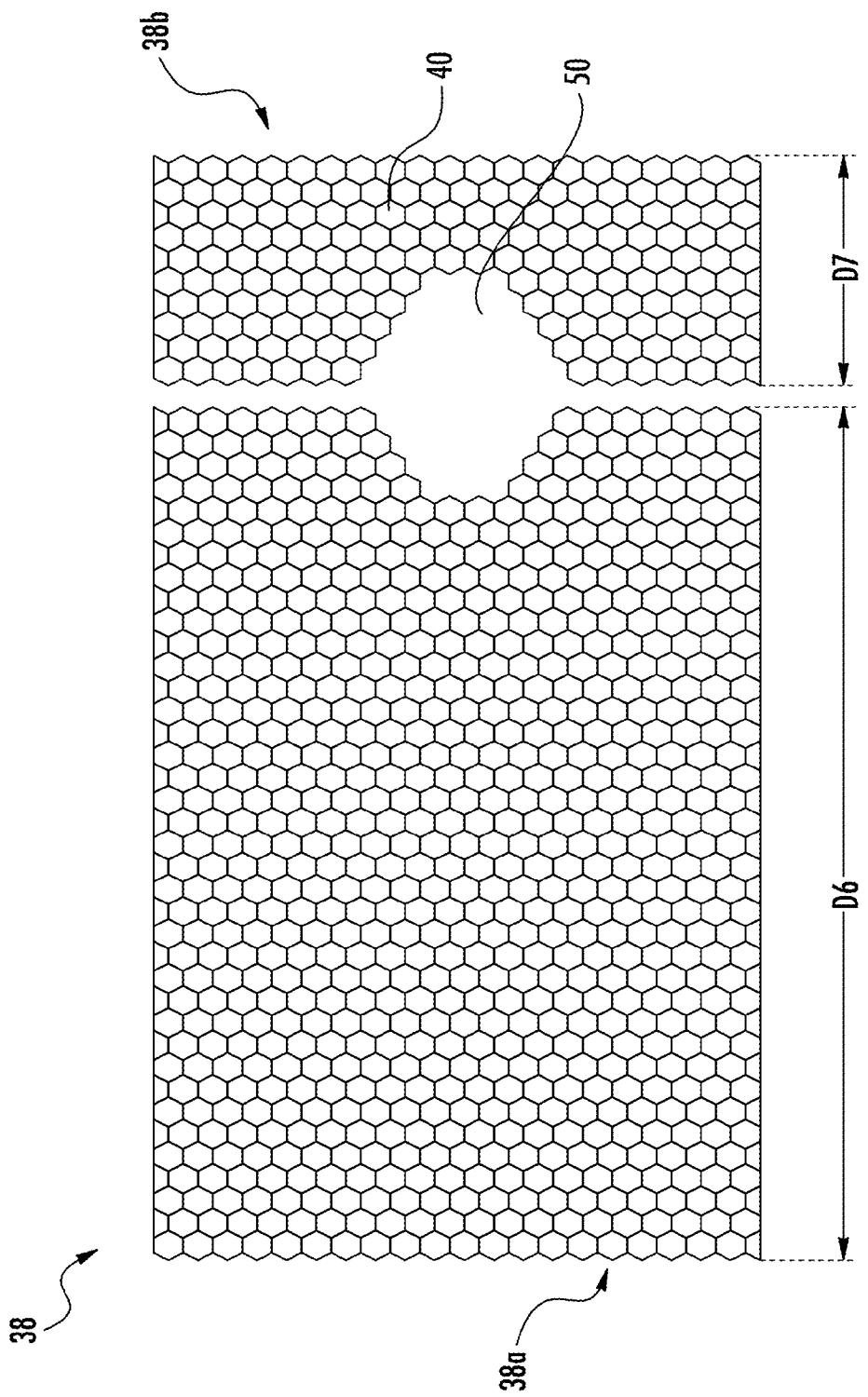
FIG. 13 is a top view of the acoustic liner in two pieces and a through hole, according to an embodiment of the invention.
Figure 14:
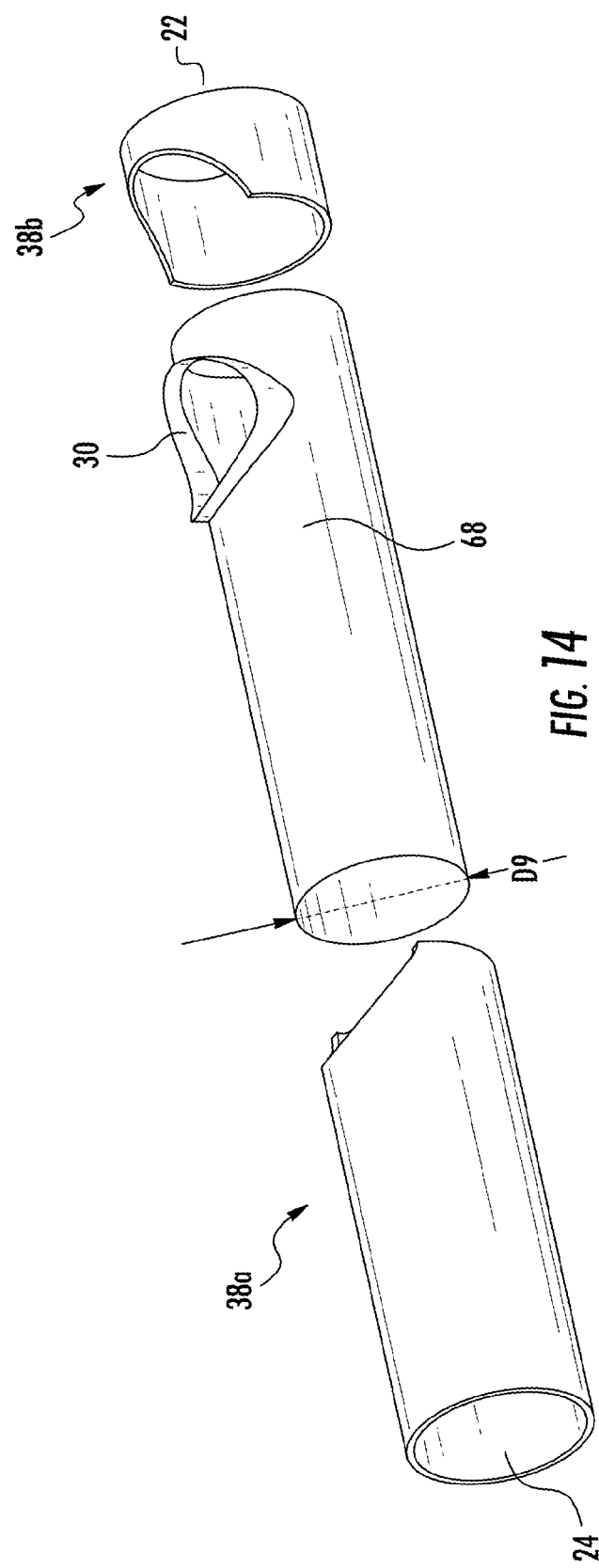
FIG. 14 is an isometric exploded view of an acoustic liner in two pieces wrapped around an inner surface of the cabin supply duct, according to an embodiment of the invention.

Referring now to FIGS. 9-13. FIG. 9 shows an isometric cross-sectional view of a cabin supply duct 20, specifically the intersection of the first tubular body 6 and the second tubular body 8 is illustrated in more detail. The acoustic liner 38 wraps to form a cylinder around the outer diameter of the inner surface 68, along the length of the first tubular body 6. In one embodiment, the intersection of the first tubular body 6 and the second tubular body 8 requires the acoustic liner to contain a hole 50 large enough to fit the second tubular body, which has a diameter D4 of about 8 inches (20 centimeters). In further embodiments the hole 50 may be either in the center of the acoustic liner 38 as illustrated by FIG. 10, at the edges of the acoustic liner 38 illustrated in FIG. 11, or at some other location on the acoustic liner 38. In yet another embodiment, the acoustic liner 38 may be composed of at least two separate pieces as illustrated by FIG. 13 and FIG. 14 instead of a single continuous layer as illustrated in FIG. 12. Utilizing multiple sections eases the installation and removal process of the acoustic liner 38 by allowing the separate sections to be slid into place via the inlet 22 and the outlet 24. In a further embodiment, the length D6 of a first section 38a may be about 24 inches (61 centimeters) and the length D7 of a second section 38b may be about 6 inches (15 centimeters) as seen in FIG. 13.

The term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft cabin supply duct of an air conditioning and temperature control system, comprising:

a first tubular body having an inlet, an outlet, an inner surface, an outer surface, a longitudinal axis, an inner shell surface located between the inner surface and outer surface at distance of about 0.375±0.006 inches (0.953±0.015 centimeters) away from the inner surface, and an acoustic liner located between the inner surface and the inner shell surface of the first tubular body; and a second tubular body having an inlet, an outlet, an inner surface, an outer surface, and a longitudinal axis, the inner surface of the second tubular body being fluidly connected to the inner surface of the first tubular body at the outlet of the second tubular body, the longitudinal axis of the first tubular body being perpendicular to the longitudinal axis of the second tubular body.

2. The aircraft cabin supply duct according to claim 1, wherein:
the acoustic liner has a thickness of about 0.375±0.006 inches (0.953±0.015 centimeters).

3. The aircraft cabin supply duct according to claim 2, wherein:
the acoustic liner is composed of a honeycomb structure.

4. The aircraft cabin supply duct according to claim 3, wherein:
the acoustic liner is composed of at least one of a fibrous aramid material and a composite material.

5. The aircraft cabin supply duct according to claim 4, wherein:
the acoustic liner is configured to cover an outer surface of a cylinder having a length of about 30 inches (76 centimeters) and an outer diameter of about 8.30 inches (21.1 centimeters).

6. The aircraft cabin supply duct according to claim 5, wherein:
the acoustic liner contains at least one through hole configured to fit a cylinder with a diameter of about 8 inches (20 centimeters).

7. The aircraft cabin supply duct according to claim 6, wherein:
the acoustic liner is composed of at least 2 separate pieces.

8. The aircraft cabin supply duct according to claim 7, wherein:
the core density of the honeycomb structure is about 3.0 lb/ft$^3$ (0.048 g/cm$^3$).

9. The aircraft cabin supply duct according to claim 8, wherein:
the honeycomb structure is composed of a plurality of over-expanded hexagonal cells.

10. The aircraft cabin supply duct according to claim 9, wherein:
the hexagonal cells have a nominal size of about 3/16 inches (0.47625 centimeters).

11. The aircraft cabin supply duct according to claim 10, wherein:
the inner surface of the first tubular body is composed of a stainless steel felt liner.

12. The aircraft cabin supply duct according to claim 11, wherein:
the inner shell surface of the first tubular body is composed of aluminum.

* * * * *